E. B. HESS.
WIND SHIELD FOR AUTOMOBILES.
APPLICATION FILED DEC. 26, 1917.

1,278,065.

Patented Sept. 3, 1918.
2 SHEETS—SHEET 1.

INVENTOR
Edward B Hess
BY
ATTORNEY

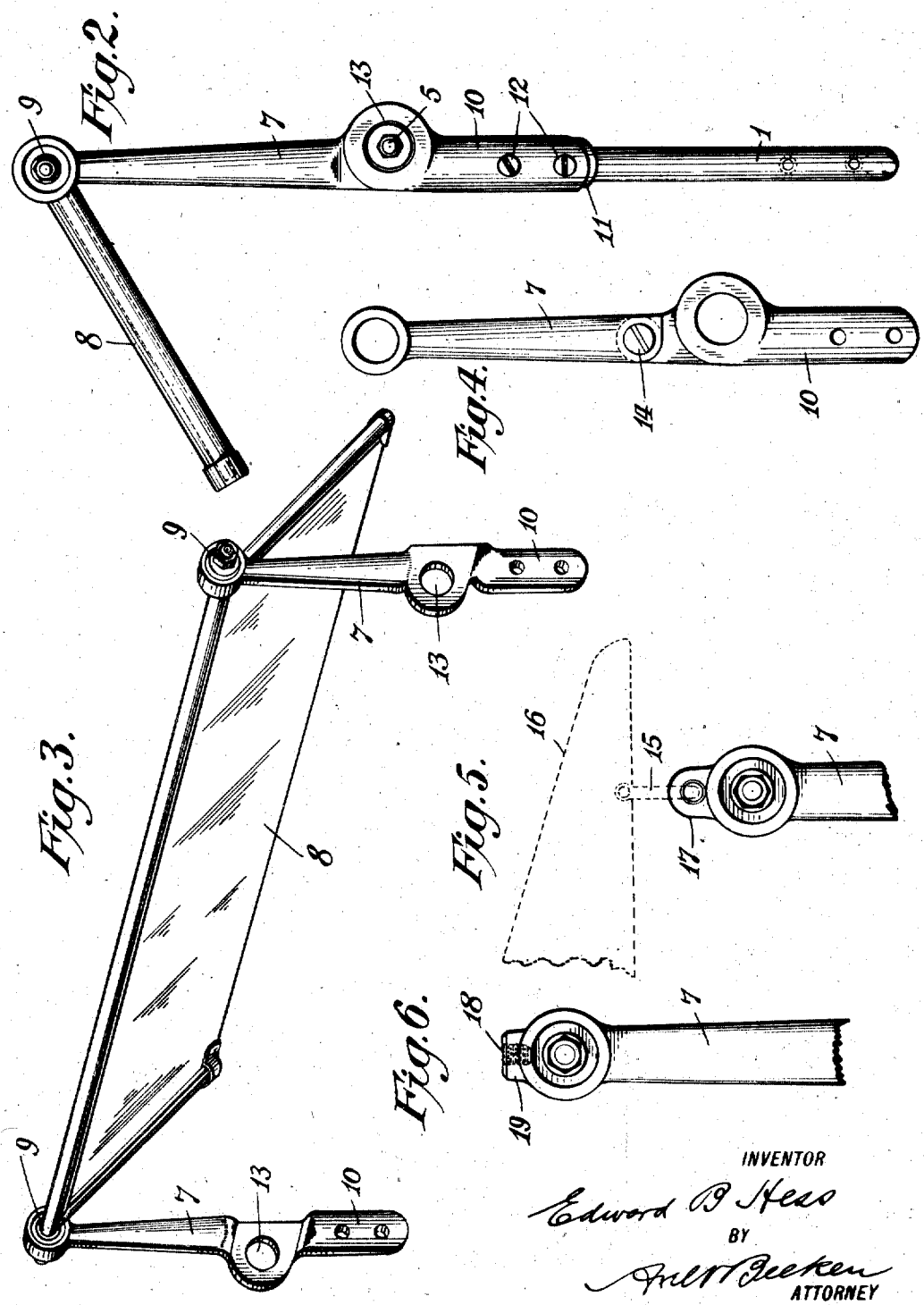

UNITED STATES PATENT OFFICE.

EDWARD B. HESS, OF BROOKLYN, NEW YORK.

WIND-SHIELD FOR AUTOMOBILES.

1,278,065. Specification of Letters Patent. Patented Sept. 3, 1918.

Application filed December 26, 1917. Serial No. 208,738.

*To all whom it may concern:*

Be it known that I, EDWARD B. HESS, a citizen of the United States, residing in the borough of Brooklyn, county of Kings, in the city and State of New York, have invented new and useful Improvements in Wind-Shields for Automobiles, of which the following is a specification.

The present invention relates to wind shields and has more particularly reference to means for providing rain shed means that will admit of a clear vision through the wind shield.

In Re-issue Patent No. 14,413 granted to me and dated December 18, 1917 there is disclosed a structure which consists of a lower shield section that occupies an upright position below the line of vision, an upper shield section that is normally in an upright position in the line of vision above the lower section and an auxiliary shield section that is normally in an upright position below the upper section and alongside of the lower section together with means that admits of the upper section being moved into a sustained forwardly inclined position independently of the other sections, and means that admits of the auxiliary section being moved independently of the upper section into a sustained inverted upright position in the field of vision above the lower section when the upper section is in a forwardly inclined position together with suitable supporting means for said devices.

This device has been found to be very efficient and desirable in shielding the upper section from rain and thus permitting the driver to have a clear vision, through the glass of the wind shield, of the road in front of him. All modern automobiles, however, are provided with wind shields when they are put on the market for sale; and it is the object of this invention to provide means whereby a certain type of two-part wind shield, such, for example, as is used on the Ford machine, may, by the addition of a third shield section, be converted into the device of my re-issue patent aforesaid.

This object is accomplished, preferably, in such manner that no parts of the old structure need be removed, it being merely necessary to add the attachment disclosed herein to the two-part hinged wind shield on the car.

In the accompanying drawings:

Fig. 2 is a side elevation of the parts shown in Fig. 1.

Fig. 3 is a perspective view of the third wind shield section which is added to the ordinary two section wind shield.

Fig. 4 shows a modified construction in which the third section is hinged so that it may occupy at will a pendent position alongside the lower section.

Fig. 5 is a detail view showing means whereby the top of an automobile may be attached to the third shield section; and Fig. 6 is a modified form showing another means for securing the top to the wind shield.

Figure 1:
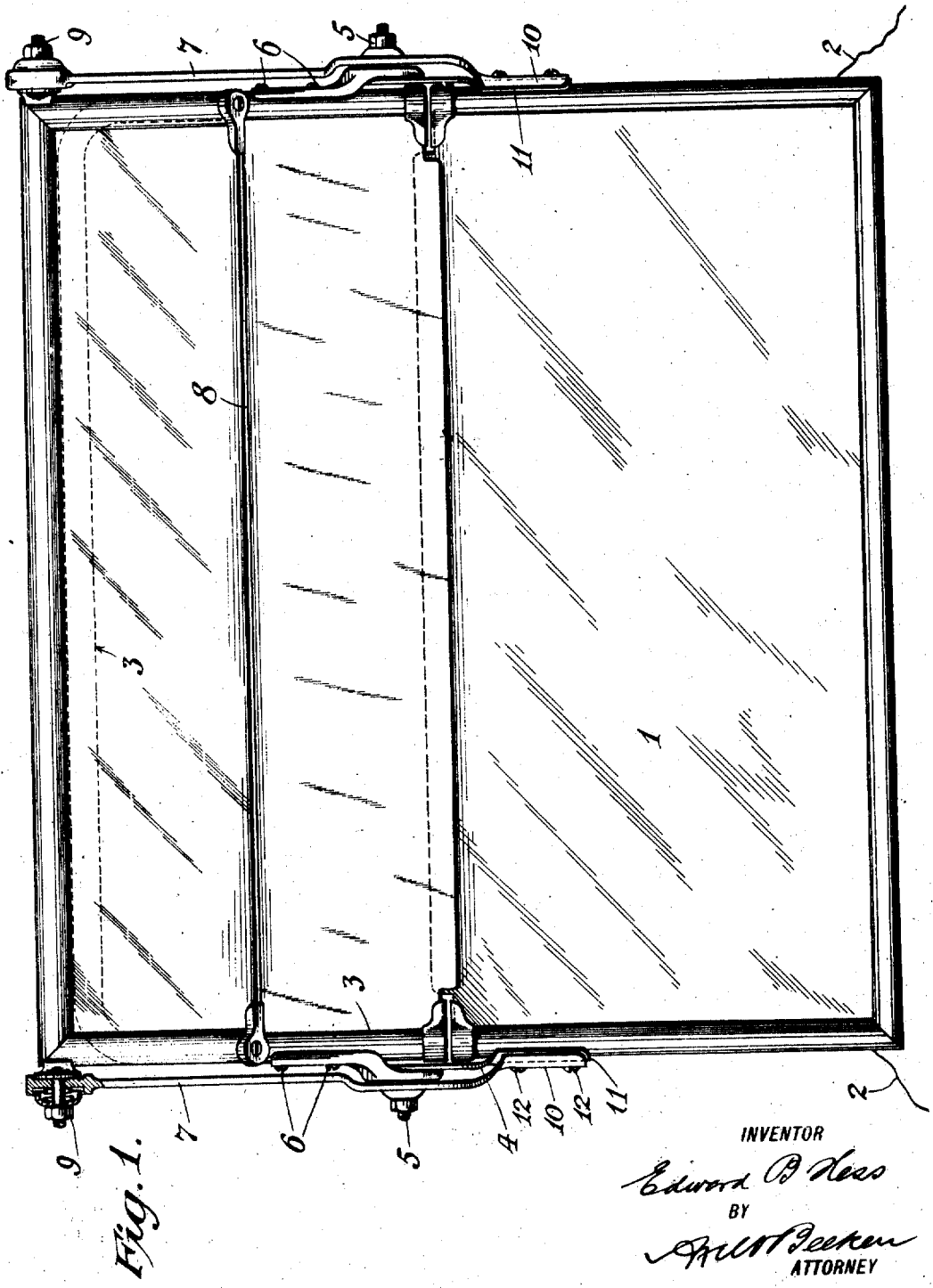
Figure 1 is a front view of an improved wind shield embodying my invention.

1 indicates a lower shield section rigidly mounted on the car in any suitable manner as by means of supporting means 2 indicated by broken lines and forming in itself a part of the supporting means for the wind shield structure. 3 is a second section which may occupy an inverted upright position in the field of vision above the lower section or it may be in a pendent position alongside of the lower section. Typical means known in the art for effecting this arrangement consists of supports 4 that are secured to the lower section 1 and which have a hinge 5 connected to the upper section by means of screws 6. The parts so far described constitute a well-known type of two-part wind shield such as is used extensively on Ford cars.

To convert this wind shield into the shield of my Re-issue Patent, No. 14,413, I provide two uprights 7 having at their upper ends a third shield section 8 pivotally supported at 9 in such manner that it may be swung into a sustained inclined rain shed position, as indicated in Figs. 1, 2 and 3; or it may be moved into such other position as may be found desirable by the driver. To avoid the necessity for removal of any of the parts when the device of this application is to be attached to an existing wind shield, the uprights 7 are independent of the supports 4 and are provided with end portions 10 that fit over similar portions 11 of supports 4, preferably in such manner that the screws 12 may be utilized for holding both portions 10 and 11 on lower section 1. If desired, the uprights 7 may also be provided with openings 13 through which may project the hinges 5 of section 3.

It will now be understood that the three sections 1, 3 and 8 of the device of this application correspond respectively with the lower section and supporting means, with the auxiliary section and with the upper shield section of my re-issue patent referred to above.

By the use of three wind shield sections, each having an unframed edge, arranged in the manner shown in Fig. 1, there is obtained in the device of this application the advantage of the feature claimed in my Patent No. 1,243,947,—i. e. that of the three edges in the line of vision being unframed.

Hinges, such as 14 (Fig. 4), may be provided in the upright 7 whereby, if desired, a portion of said upright may be swung downwardly and the third shield section 8 be made to occupy a pendent position alongside the lower section.

In some types of car, it is desirable to attach the top of the car to the uprights of the wind shield; and, in Fig. 5, I have indicated a flexible connection, as 15, that may be secured at one end to the top 16 and at its other end to a post 17 carried on the upper end of upright 7. As a modified form, in Fig. 6, an upright 7 is shown as provided with a threaded opening 18 in the base 19 whereby a threaded member carried by the top of a car may be secured to the upright in proper position.

I claim:

1. A windshield comprising: a fixed upright lower section below the field of vision, a second section hinged at its lower end to the lower section whereby it may occupy at will a pendent position alongside of the lower section or an inverted upright position in the field of vision above the lower section, uprights secured to and extending upwardly from the lower section, and a third section occupying a pendent position alongside of the second section and pivotally connected at its upper end with said uprights to swing into and out of an inclined rain shed position in the field of vision.

2. A windshield comprising: a fixed upright lower section below the field of vision, a second section hinged at its lower end to the lower section whereby it may occupy at will a pendent position alongside of the lower section or an inverted upright position in the field of vision above the lower section, uprights secured to and extending upwardly from the lower section, a third section occupying a pendent position alongside of the second section and pivotally connected at its upper end with said uprights to swing into and out of an inclined rain shed position in the field of vision, and a hinge on said supporting means for permitting the third section to occupy a pendent position alongside of the lower section.

Signed at New York, in the county of New York and State of New York, this 24th day of December 1917.

EDWARD B. HESS.